Jan. 3, 1956     C. S. GRIMSHAW     2,729,778
MOTOR PROTECTION DEVICE
Filed Sept. 16, 1954
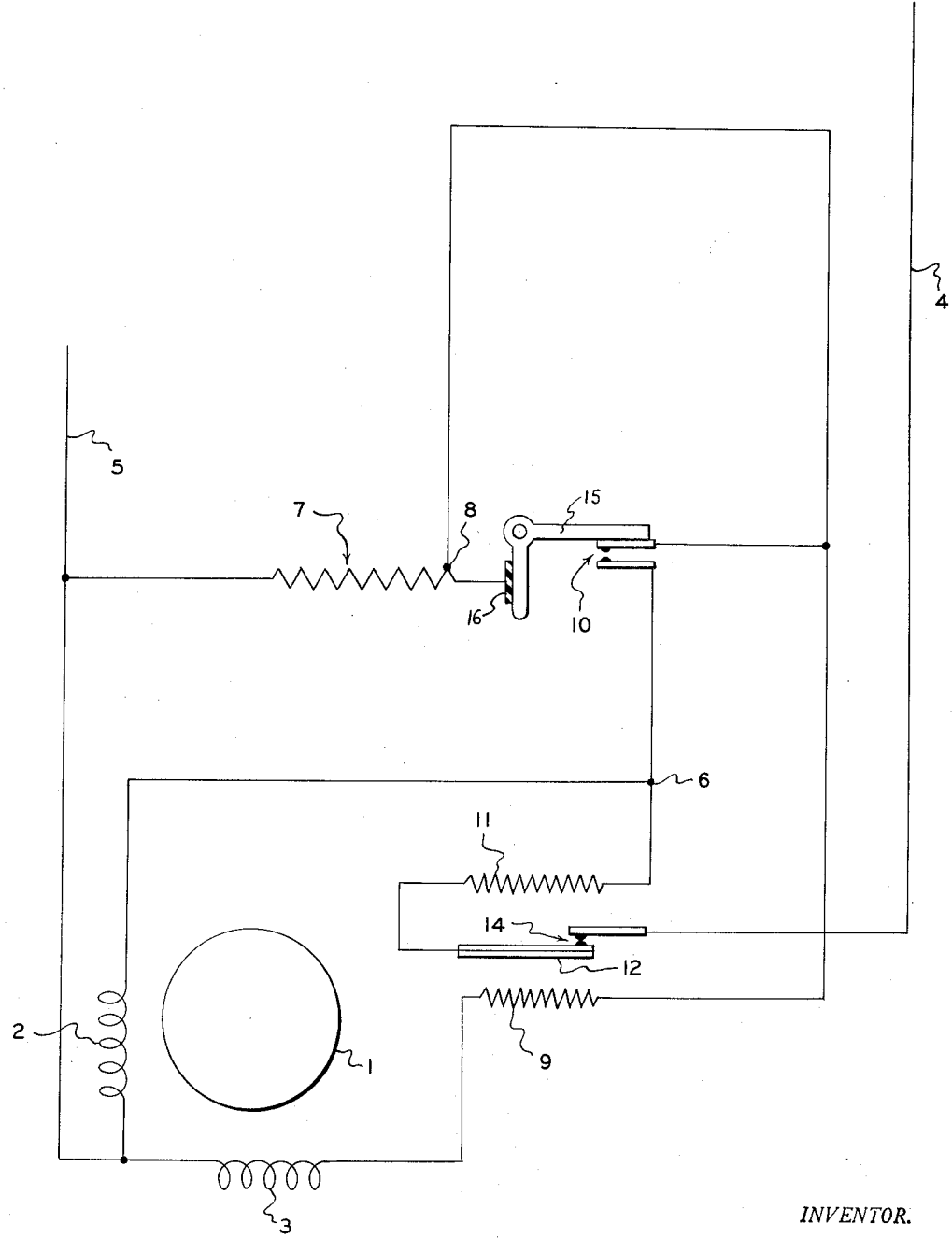
*INVENTOR.*
CHARLES S. GRIMSHAW
BY
HIS ATTORNEY United States Patent Office 2,729,778
Patented Jan. 3, 1956

2,729,778

MOTOR PROTECTION DEVICE

Charles S. Grimshaw, Fulton, Ill., assignor to General Electric Company, a corporation of New York Application September 16, 1954, Serial No. 456,593

1 Claim. (Cl. 318—221)

This invention relates to a motor protection device and, more particularly, to a device for protecting high speed single phase motors.

While a single phase motor is running, suitable means operated by the motor are provided for cooling the motor so that the windings will not become overheated due to the large current passing therethrough. However, when the motor stalls or stops due to a low voltage condition, for example, and the high current is still supplied to the main winding, it will be obvious that the main winding will be damaged in a short period of time if suitable means are not provided for removing this heat or the flow of current is not stopped.

In hermetic compressors of the refrigeration type, the motor is disposed within a sealed casing so that air cannot be employed to cool the windings unless there is conduction from the windings to the casing. If the motor is suspended in the casing by springs, for example, then obviously there is no means of conducting the heat to the casing when the rotor stalls so that the windings will burn out if the flow of current is not interrupted in this type of motor.

While it is desirable to stop the flow of current as soon as possible after the rotor stalls, it is still necessary in some single phase motors used in hermetic compressors, for example, that a high current, which will damage the windings quickly if the rotor stalls, be supplied to operate the motor.

A primary object of this invention is to provide an improved motor protective device to limit the motor temperature rise under stalled conditions and still obtain full power output during running conditions.

An object of this invention is to provide a hot wire type protective relay that has a longer starting period at low voltage than at high voltage.

Further objects and advantages of the invention will become apparent as the following description proceeds and the features of novelty which characterize the invention will be pointed out with particularity in the claims annexed to and forming a part of this specification.

In accordance with this invention, the power supply line has contacts therein that control the flow of current to the running and starting circuits of a single phase motor having a rotor. The starting circuit, which includes the starting winding, has contacts therein that are opened after a predetermined period by means that are in parallel with the starting winding when the starting contacts are closed. Both the power supply line and the starting circuit have means therein that cooperate to open the supply contacts after the rotor stalls for a predetermined period greater than the first predetermined period.

For a better understanding of the invention reference may be had to the accompanying drawing, in which the single figure is a wiring diagram of a single phase motor embodying the present invention.

Referring to the drawing, there is shown a single phase electric motor comprising a rotor 1, a main or running winding 2, and a starting winding 3. The running circuit that includes the running winding 2 and the starting circuit that includes the starting winding 3 are connected at 6 to a power line 4. A power line 5 is connected to the opposite ends of the running circuit and the starting circuit.

A resistance wire heater 7 is disposed across the power line 5 and the starting circuit, which includes the starting winding 3, and is connected to the starting circuit at 8. The starting circuit includes a second resistance heater 9 that is disposed in the starting circuit between the starting windings 3 and the connection 8, which is the point at which the resistance heater 7 is connected to the starting circuit. A starting circuit switch comprising a pair of starting contacts 10 is disposed in the starting circuit between the connection 8 and the connection 6.

The contacts 10 are actuated to open and closed positions by expansion and contraction of the resistance heater 7, respectively. One end of the heater 7 is connected to a pivoted member 15 on which one of the contacts 10 are disposed. It will be seen that the member 15 includes an insulated portion 16 that prevents current from flowing through the member 15 from the heater 7. Thus, expansion of the wire heater 7 rotates the member 15 to break the contacts 10.

A thermally operated overload switch comprises a pair of overload contacts 14 in the power line 4 and controls the current flow to the running and starting circuits. A resistance heater 11 and a bimetal member or strip 12 are disposed in the running and starting circuits from the power supply line 4 between the connection 6 and the contacts 14. The contacts 14 are actuated to their open position by heating the bimetal member 12.

Considering the operation of the present device, current is supplied to both the running and starting circuits when the motor is started since the contacts 10 and 14 are both closed at the start. Current is also supplied to the resistance heater 7, which is in parallel with the starting winding 3 when the contacts 10 are closed to form an auxiliary circuit. This resistance heater 7 has a large resistance and small mass so that it will be heated in a very short time such as one second, for example. When this resistance heater 7 becomes heated, it expands in length and actuates the contacts 10 through the member 15 to open the contacts. The one-second interval, which is required for the heater 7 to become heated, is sufficient to permit the motor to start.

Once the contacts 10 are open and assuming that the rotor 1 is running, then the resistance heater 7 is disposed in a closed circuit that includes the second resistance heater 9 and the starting winding 3. The rotation of the rotor 1 induces a voltage in the starting windings 3 that is approximately ninety degrees out of phase with the voltage in the main winding 2. This induced voltage generates a current in the resistance heater 7 that is sufficient to keep the resistance heater 7 expanded in length so that it will hold the contacts 10 open. If the motor stops or stalls due to low voltage, for example, there is no longer any current flowing through the resistance heater 7 since the rotor 1 is not rotating and the resistance heater 7 cools and contracts to close the contacts 10 through the member 15. The full line voltage is then applied across the resistance heater 7 and it will again expand in the predetermined period to again open the starting contacts as previously stated.

Each time contacts 10 close line voltage is applied to resistance 7 and to the start winding 3 through second resistance heater 9. Second resistance heater 9 therefore helps heat bimetal 12 so less current is required in resistance heater 11 to open the overload contacts 14 than if no current flowed in the second resistance heater 9. Therefore, under stalled conditions less current in the resistance heater 11 will be required to open overload contacts 14 than during running conditions when only the induced current flowing through the heater 7 flows through the second resistance heater 9.

It will be understood that the current flowing through the resistance heater 11 when the rotor is running and the current flowing through the second resistance heater 9 due to the induced voltage is not sufficient to heat the bimetal member 12 to open the contacts 14. However, when full line voltage is applied across the second resistance heater 9 for a predetermined period greater than the period that it requires the resistance heater 7 to expand to open the contacts 10, there results a heat of sufficient intensity to expand the bimetal member 12 to actuate the contacts 14 to open the contacts 14.

The resistance of heater 11 is selected to limit the motor temperature under running conditions. The resistance of second resistance heater 9 is selected to limit the motor temperature rise under stalled conditions when no auxiliary means are provided for cooling.

Thus, the present invention provides a device for automatically starting the motor as soon as it stops or stalls but at the same time preventing the windings from being damaged by overheating. This invention has the advantage of not requiring any additional leads into a hermetically sealed case to determine if the motor is running.

While the present invention has been described by reference to a particular embodiment thereof, it will be understood that modifications may be made by those skilled in the art without actually departing from the invention. Therefore, the appended claim is intended to cover all such variations as come within the true spirit and scope of the invention.

I claim:

In combination, a single phase motor adapted to be connected to a power supply line and including a rotor, a starting winding and a running winding; starting and running circuits for said motor; said running circuit including, in series connection, said running winding, a thermally operated overload switch and a running circuit overload heater; said starting winding including, in series connection, said starting winding, a starting circuit overload heater, said overload switch, said running circuit overload heater, and starting circuit control contacts; a resistance heater actuating said starting circuit control contacts and connected in parallel with said starting winding and in series with said starting circuit control contacts, said running circuit overload heater and said overload switch; said resistance heater being connected across said power line when said starting circuit control contacts are closed and opening said starting circuit contacts after connection of said motor to said supply line for a predetermined period of time; said resistance heater and said starting circuit overload heater also forming part of and being energized by a closed circuit including said starting winding when said starting circuit contacts are open whereby said resistance heater holds said starting circuit contacts open when said rotor is running and closes said contacts to energize said starting winding circuit when said rotor stalls.

References Cited in the file of this patent

UNITED STATES PATENTS

| | | |
|---|---|---|
| 1,997,673 | Boothby | Apr. 16, 1935 |
| 2,095,579 | Werner | Oct. 12, 1937 |
| 2,132,888 | Werner | Oct. 11, 1938 |
| 2,133,400 | Raney | Oct. 18, 1938 |
| 2,158,288 | Kuhn | May 16, 1939 |
| 2,165,082 | Weber | July 4, 1939 |
| 2,175,032 | Schaefer | Oct. 3, 1939 |
| 2,255,437 | Pearce | Sept. 9, 1941 |
| 2,296,123 | Stimson | Sept. 15, 1942 |
| 2,338,515 | Johns | Jan. 4, 1944 |